United States Patent [19]
Wikle

[11] Patent Number: 5,645,466
[45] Date of Patent: *Jul. 8, 1997

[54] APPARATUS AND METHOD FOR CONTOUR GRINDING GAS TURBINE BLADES

[76] Inventor: Kenneth C. Wikle, 1107 Belvoir Ave., Dayton, Ohio 45409

[*] Notice: The term of this patent shall not extend beyond the expiration date of Pat. No. 5,503,589.

[21] Appl. No.: 625,335

[22] Filed: Apr. 1, 1996

Related U.S. Application Data

[63] Continuation of Ser. No. 262,005, Jun. 17, 1994, Pat. No. 5,503,589.

[51] Int. Cl.$^6$ ........................................... B24B 49/00
[52] U.S. Cl. ................................. 451/5; 451/11; 451/8
[58] Field of Search .......................... 451/5, 11, 8, 9, 451/10, 242, 246, 251, 236, 283, 285, 272, 273–276, 226–228, 241, 282

[56] References Cited

U.S. PATENT DOCUMENTS

| | | |
|---|---|---|
| 4,053,289 | 10/1977 | Tatsumi . |
| 4,481,742 | 11/1984 | Shimizu et al. . |
| 4,704,825 | 11/1987 | Moore . |
| 4,831,785 | 5/1989 | Sigg . |
| 4,894,597 | 1/1990 | Ohtomi . |
| 4,993,896 | 2/1991 | Dombrowski et al. . |
| 5,193,314 | 3/1993 | Wormley et al. . |
| 5,197,228 | 3/1993 | Sharkey, III et al. . |
| 5,261,768 | 11/1993 | Loucks et al. . |

Primary Examiner—D. S. Meislin
Assistant Examiner—Derris H. Banks
Attorney, Agent, or Firm—Jacox, Meckstroth & Jenkins

[57] ABSTRACT

A contoured gas turbine blade has tapered outer surfaces projecting from a base which is secured to a work holder mounted on a rotary table. This table is supported by an X-Y cross slide, and separate stepping motors rotate and move the holder on the three axes. A high speed grinder motor has a shaft supporting a grinding wheel for rotation on a fourth axis generally parallel to the rotary axis. The grinder motor is supported for universal tilting movement on fifth and sixth axes which are perpendicular to the fourth axis and intersect the grinding wheel, and two stepping motors and ball screw slides control the tilting movement. An adjustable follower is supported adjacent the grinding wheel for engaging the blade while the blade moves, and the grinding wheel removes weld flash from the tip of the blade to form a tapered contoured weld surface which is a smooth extension of the tapered contoured blade surface. The grinding wheel motor is replaced with a fixture having separate electrical contact probes which replace the grinding wheel and follower and provide for using motor position readings from a finished blade to generate a computer program for automatically controlling the stepping motors during the grinding operation.

19 Claims, 5 Drawing Sheets

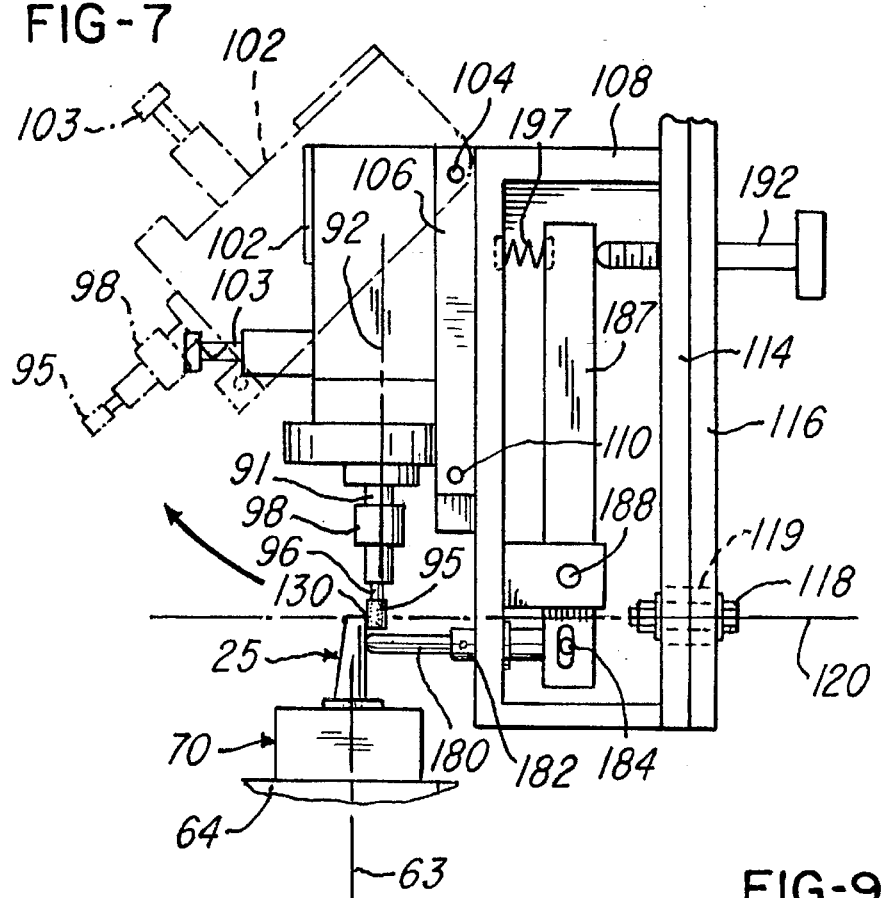
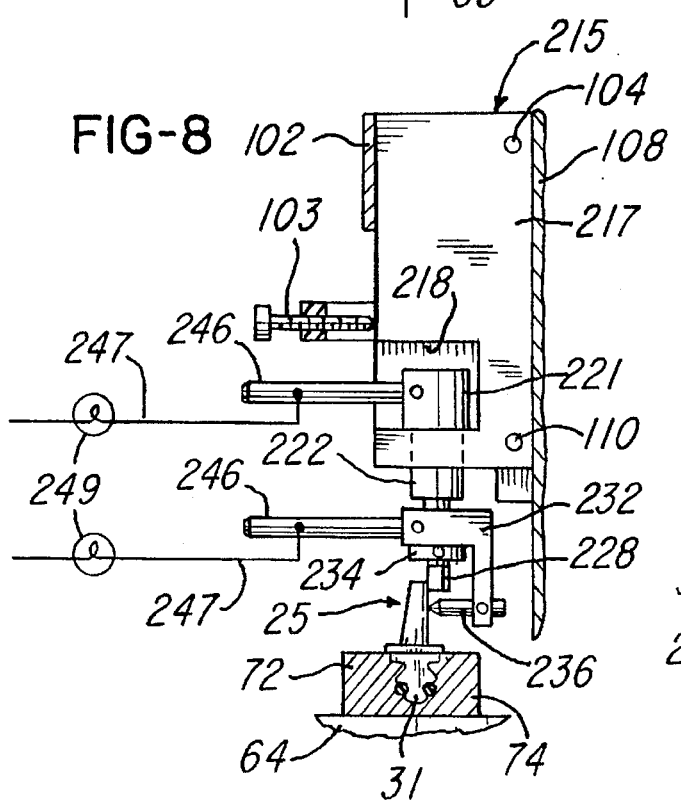
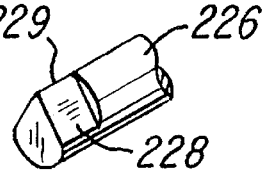
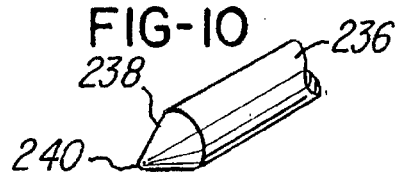
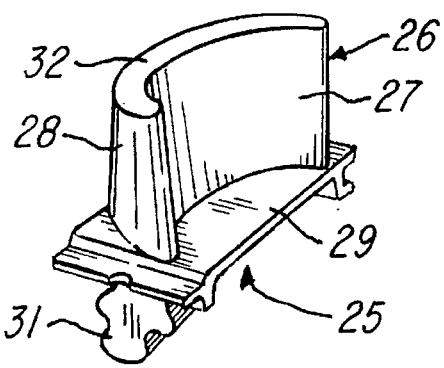

APPARATUS AND METHOD FOR CONTOUR GRINDING GAS TURBINE BLADES

RELATED APPLICATION

This application is a continuation of application Ser. No. 08/262,005, filed Jun. 17, 1994, U.S. Pat. No. 5,503,589.

BACKGROUND OF THE INVENTION

In the rebuilding of gas turbine engines, usually the tip surfaces of the high pressure turbine blades are worn or eroded resulting in an undesirable clearance or gap between the tip surfaces and the surrounding stator. While it is sometimes possible to rebuild the blade tips by applying a weld bead, the welding operation produces weld flash which projects laterally from the tips of the blades, and the flash must be removed by grinding. Since the blades have a tapered contoured peripheral surface, the weld flash is usually removed manually by grinding with hand-held grinders or grinding belts. This manual grinding operation requires considerable labor and high dexterity. It is also difficult to grind the weld flash so that the contoured weld surface forms a smooth and flush continuation of the tapered blade surface around the entire periphera of the blade.

It has been determined that it would be very desirable to perform the grinding operation on each blade with an automatic grinding machine which removes the weld flash from the tip of each blade and forms a contoured weld surface on the tip which is a smooth continuation or extension of the contoured tapered blade surface. It is also desirable for the automatic grinding machine to assure that the grinding wheel is prevented from moving below the surface of the blade to avoid producing any recess or defect which requires scrapping of the blade or reduces it performance. Since the turbine blades vary in size and shape, it is also desirable to provide for conveniently programming the automatic grinding machine according to the size and contour of a finished blade and to provide for conveniently adjusting certain moveable components of the machine to assure precision contour grinding of each blade.

One form of automated edge finishing machine is disclosed in U.S. Pat. No. 5,261,768. In this apparatus or machine, the workpiece is mounted on an X-Y table which moves the workpiece around a rotating deburring, grinding or finishing tool. The path of the workpiece is preprogrammed into tile control system for the machine, but no mechanism is provided for accommodating a workpiece having tapering or converging outer contoured surfaces such as the outer surfaces of a high pressure gas turbine blade. Other forms of automatic surface finishing machines are disclosed in U.S. Pat. No. 4,894,597 and U.S. Pat. No. 4,993,896 which are referred to in column one of U.S. Pat. No. 5,261,768.

SUMMARY OF THE INVENTION

The present invention is directed to an improved and simplified automatically controlled contour finishing or grinding apparatus or machine which provides for rapidly and efficiently finishing the outer contoured surface of a workpiece and particularly, a workpiece having a contoured and tapered outer surface. The invention is also directed to an improved method for finishing or grinding a tapering contoured outer surface of a workpiece and especially for removing weld flash from the tip of a gas turbine blade after the blade has been built up or rebuilt by adding a welded bead on the tip. The invention also provides for a simplified method of using the apparatus for determining the precise contour and taper of a turbine blade in order to preprogram the apparatus for automatically and efficiently finishing or grinding a substantial number of the blades.

In accordance with one embodiment of the invention, a contour grinding machine includes a releasable workpiece holder which is actuated by a toggle clamp and is supported by a rotary table driven by a stepping motor and having a vertical axis. The rotary table is supported by a riser block which is mounted on X-Y slides also driven by a pair of stepping motors for moving the rotary table and workpiece holder along perpendicular X-Y axes.

The X-Y slides are mounted on a rigid base plate which also supports an inverted U-shaped bridge beam. The bridge beam supports a universal tilting support head for a high speed grinder motor having a shaft which carries a small diameter grinding wheel for rotation on an axis generally parallel to the rotary axis of the workpiece holder. The grinder motor support head provides for tilting the grinding wheel axis on two perpendicular horizontal axes which intersect the grinding wheel, and the tilting movement of the head on each axis is controlled by a corresponding stepping motor. Each of the stepping motors has a manual control knob with circumferential graduations each representing very small incremental movement.

The grinder motor support head also carries a pin-like follower which projects horizontally directly under the grinding wheel and is positioned to engage the workpiece. The grinder motor support head is also pivotally supported on a vertical axis and is spring biased towards the workpiece. The grinder motor may be released and pivoted to an inclined position for conveniently replacing the grinding wheel.

The five stepping motors are independently controlled by a computer controller which is programmed for a finished turbine blade. The program is generated by replacing the grinder motor with a fixture which carries electrically insulated probes in place of the grinding wheel and follower. The probes are brought into contact with a finished blade at incremental peripheral steps around the blade and are connected to lights which indicate when contact is made with the blade surface. Readings are then taken from the manually rotated knobs on the stepping motors to determine the precise peripheral contour and taper of the finished blade.

Other features and advantages of the invention will be apparent from the following description, the accompanying drawings and the appended claims.

BRIEF DESCRIPTION OF THE DRAWINGS

FIG. 7 is an enlarged view taken generally on the line 7—7 of FIG. 4;

FIG. 8 is a fragmentary section showing a fixture used for generating a program for automatically controlling the operation of the machine shown in FIGS. 1–5;

FIGS. 9 and 10 are enlarged fragmentary perspective views of electrical probes used on the fixture shown in FIG. 8;

FIG. 11 is a perspective view of a finished turbine blade which is finished or ground on the machine shown in FIGS. 1–5;

DESCRIPTION OF THE PREFERRED EMBODIMENT

Figure 12:
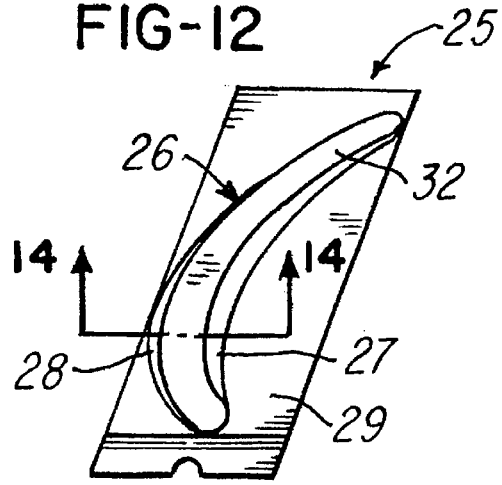
FIG. 12 is an outer end view of the turbine blade shown in FIG. 11.

FIGS. 1–5 show a grinding machine 20 constructed in accordance with the invention for grinding the tip portion of a high pressure gas turbine blade 25 (FIGS. 11 & 12). The blade 25 includes a curved or contoured body 26 having a tapered inner surface 27 and a tapered outer surface 28 connected by rounded end surfaces and integrally formed with a base 29 and a grooved root portion 31. After the blade 25 has had extensive use and the outer tip surface 32 of the blade has become worn, it is common to add a weld bead on the surface 32. The welding operation produces a peripheral excess weld flash 34 (FIG. 13) on the blade, and this peripheral flash 34 is automatically removed by the grinding machine 20 which will now be described in detail.

Figure 1:
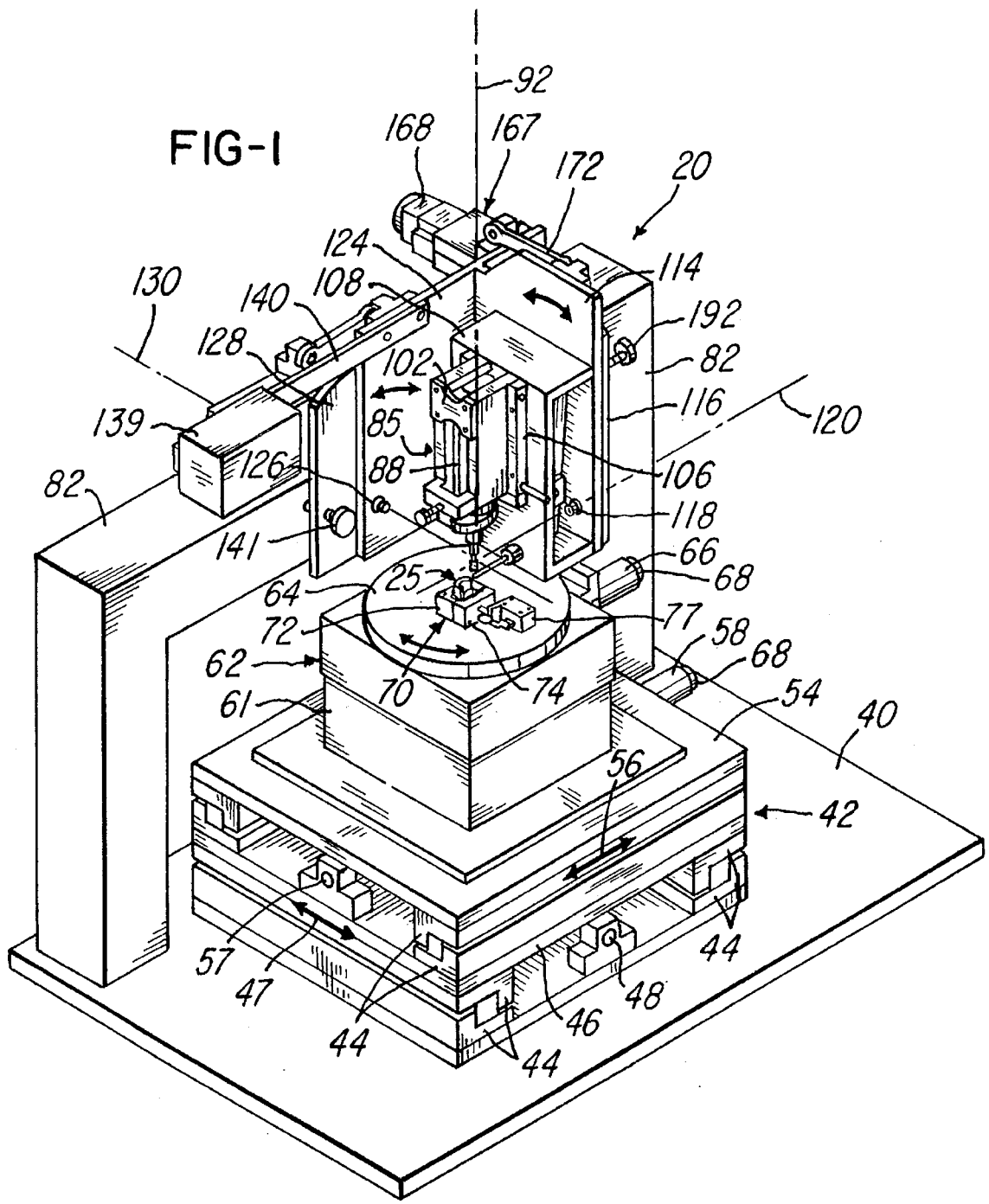
FIG. 1 is a perspective view of a contour grinding apparatus or machine constructed in accordance with the invention.
Figure 2:
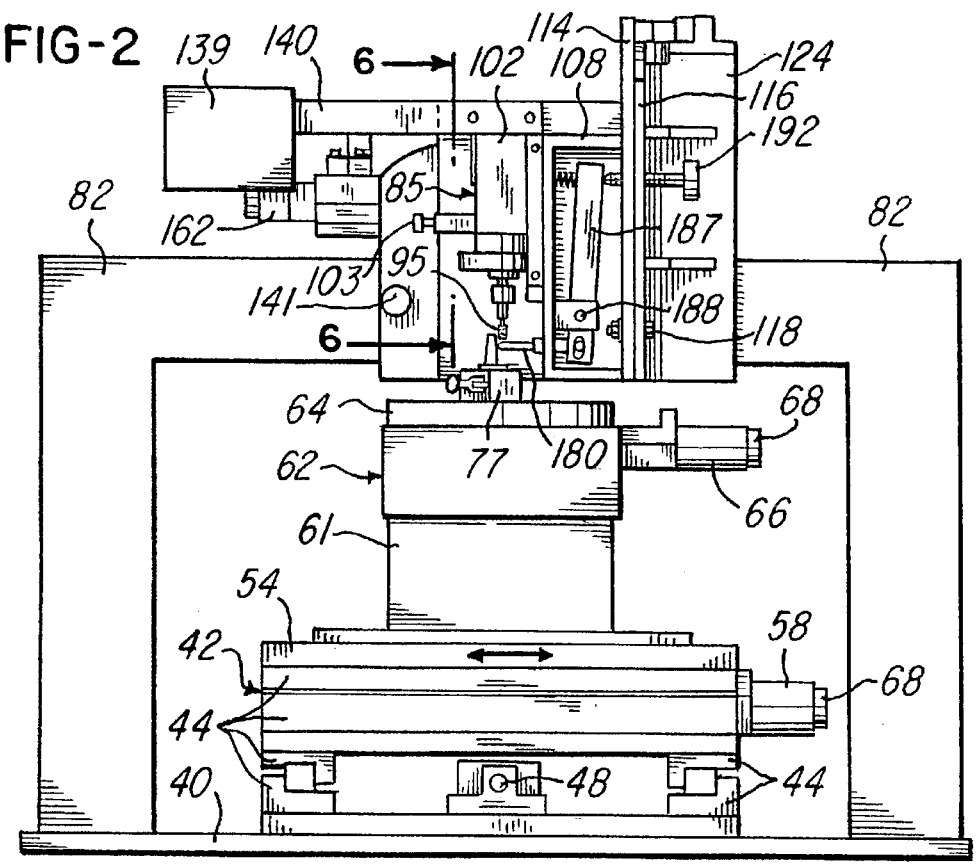
FIG. 2 is a front view of the machine shown in FIG. 1.
Figure 3:
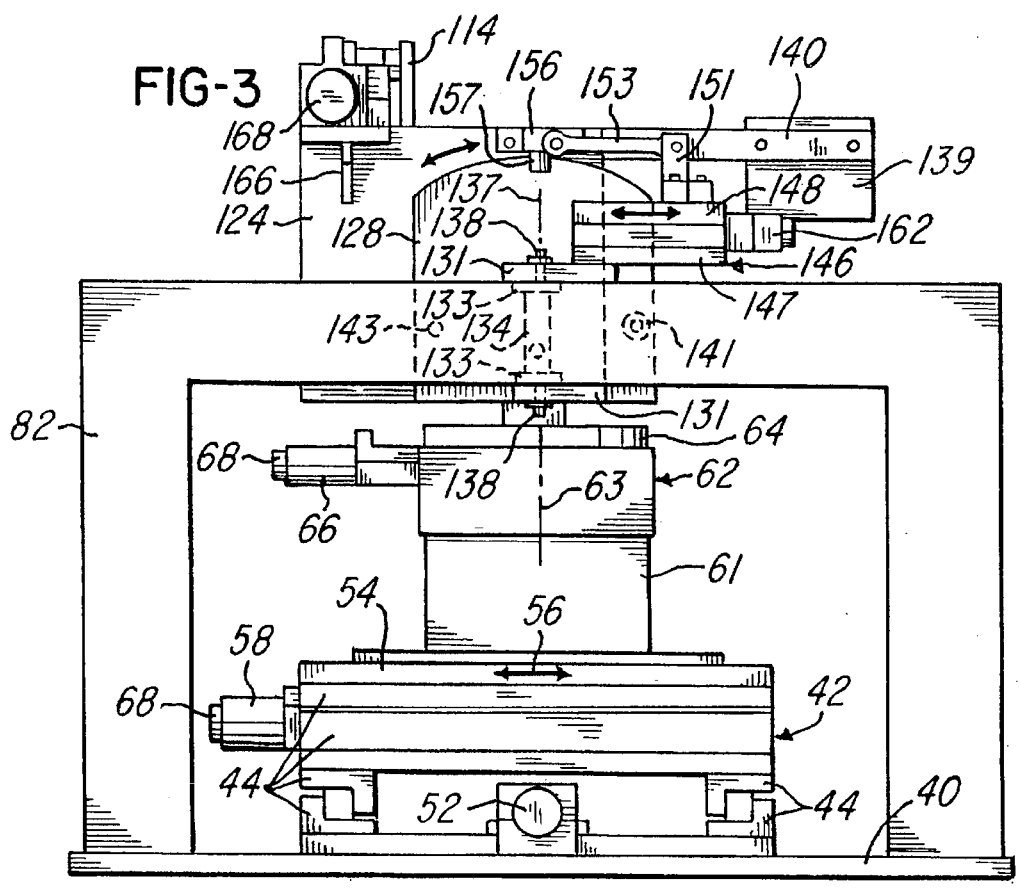
FIG. 3 is a rear view of the machine shown in FIG. 1.

Referring to FIGS. 1–5, a steel base plate 40 supports an X-Y slide table or assembly 42 which includes a set of parallel anti-friction guide rails 44 supporting a plate 46 for movement in an X direction as shown by the arrow 47. An anti-backlash lead screw 48 is connected to move the plate 46 in the X direction 47 in response to rotation by a stepping motor 52 (FIG. 3). The plate 46 supports another set of anti-friction guide rails 44 which support a plate 54 for horizontal movement in a Y direction as indicated by the arrow 56. Another lead screw 57 is connected to move the plate 54 in the Y direction 56 in response to rotation by another stepping motor 58 (FIGS. 1–5).

A riser or spacer block 61 is mounted on the table or plate 54 and supports a rotary table unit 62 which includes a circular table 64 supported for rotation on a vertical Z axis 63 (FIG. 3) and driven by a stepping motor 66 (FIG. 2). Each of the stepping motors 52, 58 and 66 have a manual control knob 68 with peripheral graduations each representing a small incremental movement of the corresponding plate or table 46, 54 or 64. The graduations on the knobs 68 for the stepping motors 52 and 58 each represents 0.001 inch of linear movement of the corresponding table or plate 46 or 54, and the graduations on the knob 68 for the motor 66 represents 0.02 degree of rotation of the table 64.

A workpiece holder 70 is mounted on the center portion of the rotary table 64 for rotation on the vertical Z axis 63 of the rotary table unit 62. The holder 70 includes a block 72 secured to the table 64 and an opposing block 74 guided for linear movement relative to the block 72 in response to actuation of a hand actuated toggle clamp unit 77. The opposing blocks 72 and 74 are provided with round pins which mate with the grooves within the root portion 31 of the blade 25 so that when the toggle clamp 77 is moved to its over-center locked position, the blade 25 is rigidly secured to the table 64 for rotary movement with the table and for perpendicular lateral or horizontal movement with the X-Y table unit 42.

An inverted U-shaped bridge beam 82 is rigidly secured or welded to the base plate 40 and supports a grinder head 85 which includes a high speed grinding motor 88 having a shaft 91 (FIG. 7) with an axis 92 (FIG. 1) of rotation. A grinding wheel 95 (FIG. 7) has a stem 96 which is secured to the shaft 91 by a releasable coupling 98. Preferably, the grinding wheel has diameter of about 0.203 inch and is driven by the motor 88 at a speed of about 160,000 R.P.M. The grinding motor 88 is retained within a box-shaped housing or frame 102 by a screw 103, and the frame 102 is pivotally supported by a pivot pin 104 extending through aligned holes within the frame 102 and a pair of parallel spaced bars 106 secured to a box-shaped housing 108. A retractable lock pin 110 (FIG. 7) secures the frame 102 and motor 88 to the housing 108. However, when the lock pin 110 is retracted or removed, the frame 102 and motor 88 may be pivoted to an inclined position (FIG. 7) to provide for convenient replacement of the grinding wheel 95.

Figure 4:
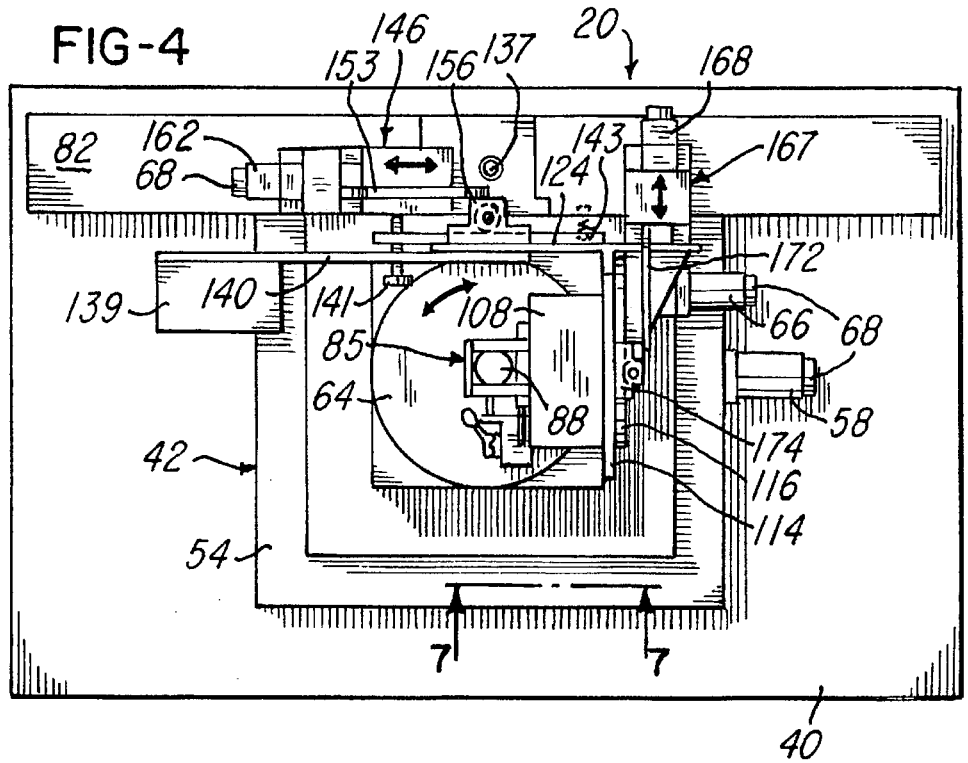
FIG. 4 is a top view of the machine shown in FIG. 1.
Figure 5:
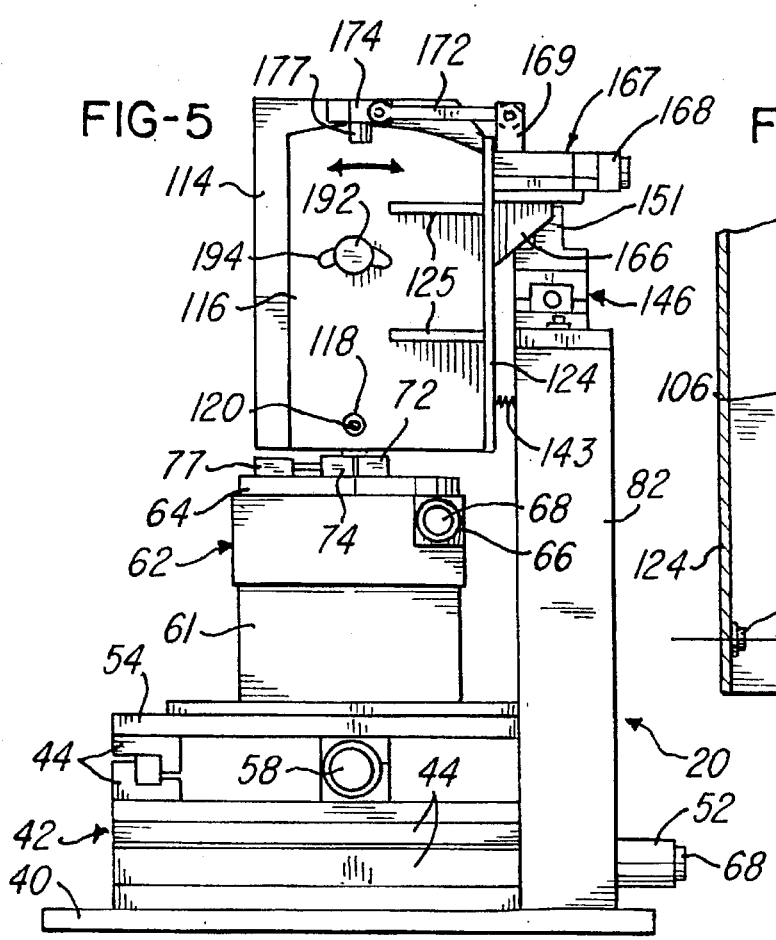
FIG. 5 is a right end view of the machine shown in FIG. 1.
Figure 6:
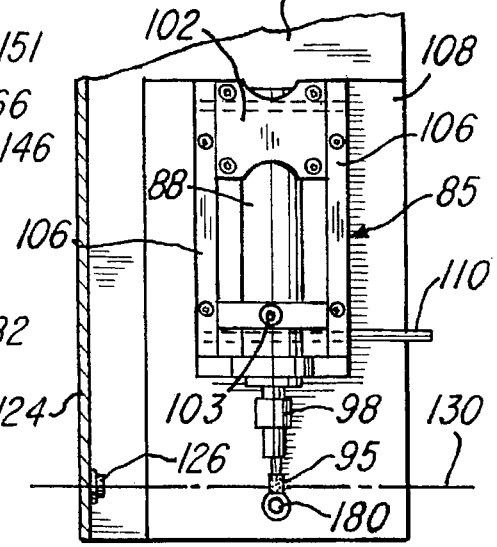
FIG. 6 is an enlarged section taken generally on the line 6—6 of FIG. 2.

Referring to FIGS. 1 and 4, the housing 108 is secured to a plate 114 which is pivotally connected to an adjacent support plate 116 by a bolt 118 (FIGS. 1 & 2) extending through anti-friction ball bearings 119 (FIG. 7) within the plates. Thus the plate 114, housing 108, frame 102 and grinder motor 88 are supported for pivotal or tilting movement on a horizontal "T" axis 120 (FIG. 1) which intersects the grinding wheel axis 92 at the center of the grinding wheel 95. (FIG. 7). As shown in FIGS. 4 and 5, the support plate 116 is rigidly secured or welded to a plate 124 and is braced by a set of brackets 125 welded to the plates. The plate 124 is pivotally supported by a pivot bolt 126 (FIG. 1) and a set of anti-friction bearings (not shown) to a plate 128 for pivotal movement of the plates 124, 116, 114 and grinder head 85 as a unit on a "U" axis 130 which intersects the axis 120 (FIG. 7) and is tangent to the grinding wheel 95. The plate 128 is welded to a pair of vertically spaced flanges 131 (FIG. 3) projecting rearwardly to receive the top cross member of the bridge beam 82. A pair of anti-friction bearings 133 and a shaft 134 support the flanges 131 and plate 128 for pivotal movement on a vertical axis 137 (FIG. 3), and a set of screws 138 secure the flanges 131 to the shaft 134. A weight 139 is mounted on an arm 140 secured to the plate 124 for counterbalancing the weight of the plate 124 all of the components carried by the plate on the other side of the pivot axis 130.

Referring to FIGS. 3 and 4, an adjustment screw 141 is threaded through the plate 128 and engages the front surface of the bridge beam 82, and a compression spring 143 (FIG. 4) extends between the plate 128 and bridge beam 82 for normally urging the screw 141 against the bridge beam. As also shown in FIGS. 3 and 4, a ball slide unit 146 includes a bottom plate 147 welded to the upper flange 131 and a horizontally movable upper plate 148 which carries a bracket 151. A link arm 153 has one end pivotally connected to the bracket 151 and an opposite end pivotally connected to a bearing block 156 secured to the plate 124. The block 156 also supports a roller 157 which projects downwardly adjacent the plate 128 and maintains the plates 124 and 128 in contacting relation while the plate 124 is free to pivot on the horizontal "U" axis 130. Another stepping motor 162, which is identical to the stepping motors 52, 58, and 66, actuates the slide unit 146 to effect tilting movement of the plates 124, 116 and 114 and grinder head 85 on the "U" axis 130.

Referring to FIG. 5, a bracket 166 is secured or welded to the plate 124 and supports another ball slide unit 167 and stepping motor 168, which are identical to the ball slide unit 146 and stepping motor 162. A bracket 169 projects upwardly from the upper slide plate of the unit 167, and a link arm 172 pivotally connects the bracket 169 to a bearing block 174 secured to the upper edge portion of the plate 114. The block 174 also supports an anti-friction roller 177 which holds the plate 114 adjacent the plate 116 while the plate 114 and grinder head 85 pivot on the "T" axis 120 in response to the actuation of the stepping motor 168.

Figure 13:
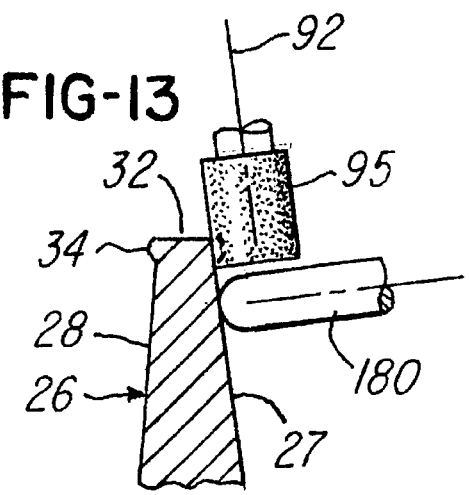
FIG. 13 is an enlarged fragmentary section of a turbine blade having welded tip flash being ground on the machine shown in FIGS. 1–5 in accordance with the invention.

A pin-like follower 180 (FIG. 7) projects horizontally through a bushing 182 supported by the housing 108 and is positioned directly below the grinding wheel 95 to detect the blade surface as shown in FIG. 13. The inner end portion of the follower 180 is connected to a cross pin 184 which extends through aligned slots within the lower end portion of a lever 187 pivotally supported by a pivot pin 188. An adjustment screw 192 (FIGS. 5 and 7) extends through an arcuate slot 194 within the plate 116 and through a threaded hole within the plate 114. The inner end of the screw 192 engages the upper end portion of the lever 187, and a compression spring 197 normally urges the lever 187 against the inner end of the adjustment screw 192. As apparent from FIG. 7, adjustment of the screw 192 produces fine and precision axial adjustment of the follower 180 relative to the outer surface of the grinding wheel 95.

Figure 14:
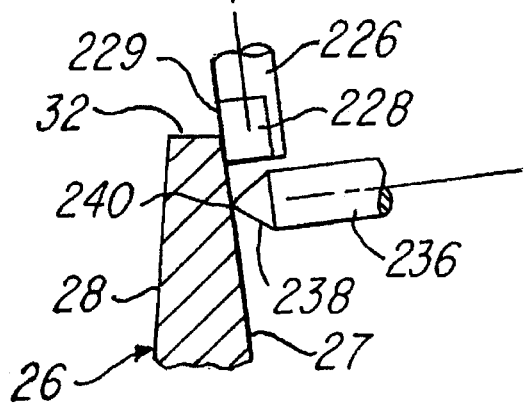
FIG. 14 is an enlarged fragmentary cross-section of a finished turbine blade as taken generally on the line 14—14 of FIG. 12 and showing the use of the electrical probes shown in FIGS. 8–10.
Figure 15:
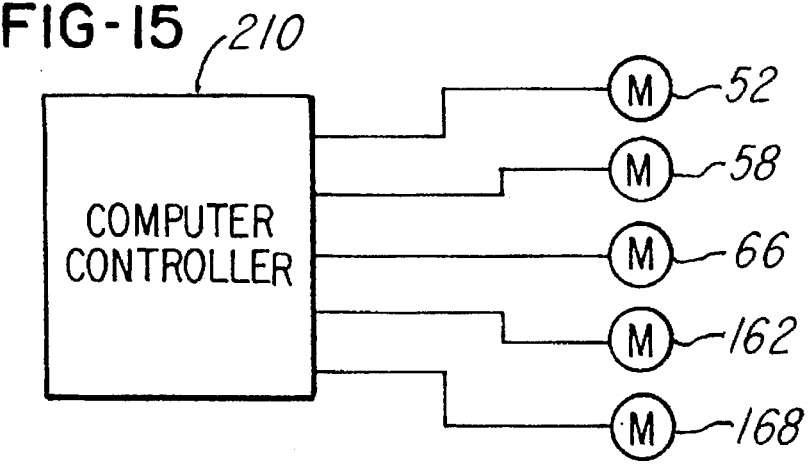
FIG. 15 is a basic block diagram of the control system for the grinding machine shown in FIGS. 1–5.

Referring to FIG. 15, a computer controller 210 is programmed to control each of the stepping motors 52, 58, 66, 162 and 168 according to the taper and contour of the turbine blade body 26. Preferably, the controller 210 comprises a commercially available IBM compatible computer with a 386 processing chip and two commercially available motor control boards for driving the stepping motors. In order to program the controller, the grinder motor 88 is removed by releasing the screw 103, and is replaced by a fixture 215 (FIG. 8) which includes a block 217 having a cavity 218 which receives the head portion 221 of a shaft 222 supported for rotation by the block 217. The shaft 222 supports a probe 226 on the same generally vertical axis 92 for the grinding wheel 95. The probe 226 has a V-shaped lower end portion 228 with an edge 229 positioned to contact the upper end or tip portion (FIG. 14) of a finished turbine blade 25 supported by the workpiece holder 70.

An angular bracket 232 (FIG. 8) is supported for rotation by an electrical insulating bushing 234 mounted on and secured to the probe 226. The bracket 232 supports a generally horizontal adjustable probe 236 having a conical or pointed end surface 238 positioned directly below the V-shaped end surface 228 on the probe 226. The probe 236 is positioned so that its tip 240 (FIG. 14) is precisely aligned with the edge 229 on the probe 226. A set of rod like handles 246 (FIG. 8) projects horizontally outwardly from the head portion 221 and the bracket 232 and are electrically connected by conductors 247 to corresponding light bulbs 249 and a low voltage power source such as a flashlight battery (not shown). When either the tip 240 of the probe 236 or the edge 229 of the probe 226 contacts the outer surface of the turbine blade body 26, the corresponding bulb 249 is illuminated.

When it is desired to program the controller 210 for grinding or finishing a batch of turbine blades 25 having tips with welded flash 34 (FIG. 13), a finished turbine blade is clamped within the holder 70 with the fixture 215 installed within the housing 102 in place of the grinder motor 88 and with the follower 180 retracted. The stepping motors 52, 58 and 66 are then operated manually for shifting and rotating the blade in small increments or steps around the periphery of the blade. At each step, the stepping motors 162 and 168 are manually operated for tilting the probes 226 and 236 until both probes contact the surface of the blade when the corresponding light bulbs 249 are illuminated. After probe contact is made, the positions of all of the stepping motors are read and recorded by viewing the position of the graduation on the control knobs 68. The position of each of the five stepping motors is then entered into the computer at each degree of angular rotation of the blade through 360° of blade rotation.

After the controller 210 is programmed for a particular turbine blade, the fixture 215 is removed and replaced by the grinder motor 88, and the follower 180 is extended within the bushing 182. The finished blade 25 is then removed from the work holder 70 and the first blade having a tip with peripheral weld flash 34 is clamped within the holder. The machine 20 is then operated automatically by the controller 210 so that as the blade 25 rotates and shifts laterally slowly, the grinder wheel 95 progressively removes the peripheral flash 34, as shown in FIG. 13. The grinding wheel 95 removes the weld flash and forms a surface on the weld which is a smooth and flush extension of the surfaces 27 and 28. The contact of the follower 180 (FIG. 13) with the blade body 26 and the bias exerted by the spring 143 to urge the follower against the blade, assure that the grinding wheel 95 precisely follows each blade and does not overgrind or undergrind the blade tip. Thus the follower 180 and spring 143 prevent the formation of a cavity or defect within the blade tip during the grinding operation of each blade.

From the drawings and the above description, it is apparent that finishing or grinding apparatus constructed in accordance with the present invention, provides desirable features and advantages. For example, the support of the blade 25 by the workpiece holder 70 for rotation on a vertical or "Z" axis 63 and for horizontal movement on the "X" and "Y" axes, and the support of the grinder head 85 for universal tilting movement on the generally intersecting "T" and "U" axes 120 and 130, provide for aligning the axis 92 of the finishing tool or grinding wheel 95 (FIG. 13) parallel with the surfaces 27 and 28 around the entire periphery of the contoured blade body 26 as the blade 25 rotates. In addition, the precisely adjustable follower 180 (FIGS. 7 & 13) and the spring biased tilting movement of the grinder head 85 on the vertical axis 137, assures that the finishing tool or grinding wheel 95 forms the weld surface precisely flush with the surfaces 27 and 28. The use of the fixture 215 (FIG. 8) in place of the grinder motor 88 and the control knobs 68 on the stepping motors, also provide for using the machine 20 for simplified programming the computer controller 210 to generate a specific control program corresponding to each turbine blade 25. Another feature is provided by the pivotally supported housing 102 for the grinder motor 88 to provide for conveniently replacing a grinding wheel 95 (FIG. 7) when the grinding surface of the wheel becomes worn and less effective.

While the form of apparatus and method herein described constitute a preferred embodiment of the invention, it is to be understood that the invention is not limited to this precise form of apparatus and method, and that changes may be made therein without departing from the scope and spirit of the invention as defined in the appended claims.

The invention having thus been described, the following is claimed:

1. Contour grinding apparatus for removing weld flash from the tip of a gas turbine blade having a base and a curved and tapering peripheral surface, said apparatus comprising a holder for gripping and supporting the blade, a first support member supporting said holder and said blade on a first axis, a grinding wheel having a second axis extending generally parallel to said first axis, a motor having a shaft connected to rotate said grinding wheel on said second axis, a second support member supporting said motor and said grinding wheel, motor driven means connected to provide relative movement between said first and second support members for relatively moving said grinding wheel around said blade and for simultaneously producing tilting movement of said grinding wheel and said second axis relative to said blade and said first axis, a blade surface detector spaced from said grinding wheel and positioned for detecting said blade surface inwardly of said weld flash towards said base, and a controller for actuating said motor driven means according to a predetermined program for relatively revolving said grinding wheel and said blade surface detector around said blade and said first axis to produce an outer weld surface forming a smooth continuation of said curved and tapering peripheral surface of said blade.

2. Apparatus as defined in claim 1 wherein said blade surface detector is disposed on an axis generally perpendicular to said first and second axis and adjacent said grinding wheel.

3. Apparatus as defined in claim 1 wherein said second support member supports said grinding wheel for tilting movement of said wheel on two generally perpendicular axes each extending generally perpendicular to said second axis and generally adjacent said grinding wheel.

4. Apparatus as defined in claim 1 wherein said second support member is spring biased for urging said grinding wheel towards the blade.

5. Apparatus as defined in claim 1 wherein said grinding wheel is supported by said shaft of said motor, and said second support member is pivotable to provide for tilting said motor to an inclined position relative to said first axis for conveniently replacing said grinding wheel.

6. Apparatus as defined in claim 1 wherein said blade surface detector comprises a member having a rounded end surface for contacting said blade surface inwardly of said weld flash.

7. Apparatus as defined in claim 1 wherein said motor driven means comprise a plurality of stepping motors each having a manually adjustable control for adjusting extent of rotation.

8. Apparatus as defined in claim 1 and including a fixture supporting a set of electrically insulated probes, and said fixture positions said probes in spaced relation on said blade generally along said second axis for detecting the position and taper of said blade surface.

9. Contour grinding apparatus for removing weld flash from the tip of a gas turbine blade having a base and a curved and tapering peripheral surface, said apparatus comprising a holder for gripping and supporting the blade on a first axis, a grinding wheel having a second axis extending generally parallel to said first axis, a motor having a shaft connected to rotate said grinding wheel on said second axis, motor driven means connected to provide relative movement between said grinding wheel around said blade and for simultaneously producing tilting movement of said grinding wheel relative to said blade, a blade surface detector spaced from said grinding wheel and positioned for detecting said blade surface inwardly of said weld flash towards said base, and a controller for actuating said motor driven means according to a predetermined program for relatively revolving said grinding wheel and said blade surface detector around said blade to produce an outer weld surface forming a smooth continuation of said curved and tapering peripheral surface of said blade.

10. Apparatus as defined in claim 9 wherein said blade surface detector is disposed on an axis generally perpendicular to said first and second axis and adjacent said grinding wheel.

11. Apparatus as defined in claim 9 wherein said grinding wheel is supported for tilting movement on two generally perpendicular axes each extending generally perpendicular to said second axis and generally adjacent said grinding wheel.

12. Apparatus as defined in claim 9 wherein said grinding wheel is spring biased towards the blade.

13. Apparatus as defined in claim 9 wherein said grinding wheel is supported by said shaft of said motor, and said motor is supported for tilting movement to an inclined position relative to said first axis for conveniently replacing said grinding wheel.

14. Apparatus as defined in claim 9 wherein said blade surface detector comprises a member having a rounded end surface for contacting said blade surface inwardly of said weld flash.

15. Apparatus as defined in claim 9 and including a fixture supporting a set of electrically insulated probes, and said fixture positions said probes in spaced relation on said blade generally along said second axis for detecting the position and taper of said blade surface.

16. A method for removing weld flash from the tip of a gas turbine blade having a base and a curved and tapering peripheral surface, said method comprising the steps of supporting the blade on a first axis, supporting a motor driven grinding wheel for rotation of the wheel on a second axis generally parallel to the first axis, tilting the grinding wheel and the second axis relative to the blade and the first axis while relatively revolving the grinding wheel around the blade, supporting a blade surface detector in spaced relation to the grinding wheel, limiting movement of the grinding wheel towards the blade during the relatively revolving by detecting the blade surface with the blade surface detector inwardly of the weld flash towards the base, and controlling the relative movement according to a predetermined program for removing the weld flash from the tip of the blade with the grinding wheel and for producing an outer weld surface forming a smooth extension of the curved and tapering peripheral blade surface.

17. A method as defined in claim 16 wherein the blade surface detector comprises a blade surface contact follower having an axis, and including the step of positioning the follower with its axis disposed generally perpendicular to the second axis.

18. A method as defined in claim 16 wherein the grinding wheel is supported for tilting movement on two generally perpendicular axes each extending generally perpendicular to the second axis and generally adjacent the grinding wheel.

19. A method as defined in claim 16 and including the step of resiliently biasing the grinding wheel towards the blade.

* * * * *